(12) United States Patent
Zachut et al.

(10) Patent No.: US 9,746,981 B2
(45) Date of Patent: Aug. 29, 2017

(54) SYSTEM AND METHOD FOR MULTIPLE OBJECT DETECTION ON A DIGITIZER SYSTEM

(75) Inventors: Rafi Zachut, Rishon-LeZion (IL); Meir Morag, Savyon (IL); Amir Kaplan, Hod-HaSharon (IL); Yuval Stern, Ramat-HaSharon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 1653 days.

(21) Appl. No.: 12/078,132

(22) Filed: Mar. 27, 2008

(65) Prior Publication Data

US 2008/0238885 A1    Oct. 2, 2008

Related U.S. Application Data

(60) Provisional application No. 60/907,370, filed on Mar. 29, 2007, provisional application No. 60/907,948, filed on Apr. 24, 2007, provisional application No. 60/996,449, filed on Nov. 19, 2007.

(51) Int. Cl.
| | |
|---|---|
| *G06F 3/041* | (2006.01) |
| *G06F 3/046* | (2006.01) |
| *G06F 3/0354* | (2013.01) |
| *A63F 3/00* | (2006.01) |
| *A63F 9/24* | (2006.01) |

(52) U.S. Cl.
CPC .......... *G06F 3/046* (2013.01); *G06F 3/03545* (2013.01); *A63F 2003/00665* (2013.01); *A63F 2009/241* (2013.01); *A63F 2009/2489* (2013.01); *A63F 2300/1068* (2013.01)

(58) Field of Classification Search
CPC  G09G 5/00; G06F 3/043; G06F 3/033; G06F 3/041; G06K 11/06; G08C 21/00
USPC .................................... 345/173–178
See application file for complete search history.

(56) References Cited

U.S. PATENT DOCUMENTS

| | | | |
|---|---|---|---|
| 5,853,327 A | 12/1998 | Gilboa | |
| 6,690,156 B1 | 2/2004 | Weiner et al. | |
| 7,292,229 B2 | 11/2007 | Morag et al. | |
| 7,646,379 B1* | 1/2010 | Drennan et al. | 345/177 |
| 7,812,268 B2* | 10/2010 | Ely | 178/18.03 |

(Continued)

FOREIGN PATENT DOCUMENTS

| | | |
|---|---|---|
| EP | 0409016 | 1/1991 |
| WO | WO 02/10791 | 2/2002 |
| WO | WO 2008/120200 | 10/2008 |

OTHER PUBLICATIONS

International Search Report Dated Dec. 1, 2008 From the International Searching Authority Re.: Application No. PCT/IL2008/000431.

(Continued)

*Primary Examiner* — Tony N Ngo

(57) ABSTRACT

A digitizer system comprises at least one object incorporating an electronic tag configured for radiating at least one modulated signal and at least one second signal; a digitizer sensor configured for detecting the at least one second signal while the object is positioned on or over the digitizer sensor; and circuitry configured for identifying the object based on modulation of the at least one modulated signal and for determining a position of the object on or over the digitizer based on the detected second signal on a portion of the digitizer sensor.

51 Claims, 10 Drawing Sheets

(56) References Cited

U.S. PATENT DOCUMENTS

| | | | |
|---|---|---|---|
| 2003/0098858 A1 | 5/2003 | Perski et al. | |
| 2004/0095333 A1* | 5/2004 | Morag et al. | 345/173 |
| 2004/0155871 A1 | 8/2004 | Perski et al. | |
| 2007/0062852 A1 | 3/2007 | Zachut et al. | |
| 2007/0262964 A1* | 11/2007 | Zotov et al. | 345/173 |
| 2008/0055260 A1* | 3/2008 | Posamentier | 345/173 |

OTHER PUBLICATIONS

Written Opinion Dated Dec. 1, 2008 From the International Searching Authority Re.: Application No. PCT/IL2008/000431.
International Preliminary Report on Patentability Dated Oct. 8, 2009 From the International Bureau of WIPO Re.: Application No. PCT/IL2008/000431.

* cited by examiner

SYSTEM AND METHOD FOR MULTIPLE OBJECT DETECTION ON A DIGITIZER SYSTEM

RELATED APPLICATIONS

The present application claims the benefits under 35 U.S.C. §119(e) of U.S. Provisional Patent Application No. 60/907,370, filed on Mar. 29, 2007, U.S. Provisional Patent Application No. 60/907,948, filed on Apr. 24, 2007, and U.S. Provisional Patent Application No. 60/996,449, filed on Nov. 19, 2007, all of which are incorporated herein by reference in their entirety.

FIELD OF THE INVENTION

The present invention, in some embodiments thereof, relates to digitizing tablet systems and more particularly, but not exclusively, to multiple object detection on digitizing tablet systems.

BACKGROUND OF THE INVENTION

Digitizing tablet systems that allow a user to operate a computing device with a stylus are known. Typically, a digitizer is integrated with a display screen, e.g. over-laid on the display screen, to correlate user input, e.g. stylus interaction on the screen with the virtual information portrayed on it. Position detection of the stylus provides input to the computing device and is interpreted as user commands. Digitizing tablets configured for game applications are also known and typically involve detection of multiple objects positioned over the digitizing tablet.

U.S. Pat. No. 6,690,156 entitled "Physical Object Location Apparatus and Method and a Platform Using the Same" assigned to N-trig Ltd., and U.S. Pat. No. 7,292,229 entitled "Transparent Digitizer" also assigned to N-Trig Ltd., both of which are incorporated herein by reference in their entirety, describe a digitizing tablet system capable of detecting position of a user input, e.g. physical object, game pieces and/or styluses, including an electrical circuit, either active or passive. Typically, the system includes a transparent digitizer overlaid on a Flat Panel Display (FPD). The digitizer includes a matrix of vertical and horizontal conducting lines to sense an electric signal passing through the vertical and horizontal conductive lines. Positioning the physical object at a specific location on the digitizer provokes a signal on the digitizer whose position of origin may be detected. Typically the game pieces and/or styluses receive an excitation signal from an excitation coil surrounding the digitizer or by horizontal and vertical coils embedded in the digitizer sensor. Each one of the game pieces and/or styluses is resonant at a different frequency and therefore can be identified.

U.S. Patent Application Publication No. 2007/0062852 entitled "Apparatus for Object Information Detection and Methods of Using Same" assigned to N-trig Ltd., and which is incorporated herein by reference in its entirety, describes a detector adapted to measure an output signal of a digitizer sensor associated with an object, wherein the output signal is an object information code. The object information code typically includes information regarding the position of the object as well as information regarding identification or orientation of the object.

U.S. Pat. No. 5,853,327 entitled "Computerized Game Board" assigned to Super Dimension, Inc., and which is incorporated herein by reference in its entirety, describes a computer game and board game including an apparatus for automatically and non-discretely sensing the location of toy figures relative to the game board and actuating an audio/visual display sequence in response thereto. Typically, each of the game pieces includes a transponder that communicates with an array of coils mounted on the upper part of the game table.

The use of Radio Frequency Identification (RFID) tags for identification is well known. Most RFID tags contain at least two parts. One is an integrated circuit for storing and processing information, modulating and demodulating a (RF) signal, and performing other specialized functions. The second is an antenna for receiving and transmitting the (RF) signal. These are operated in conjunction with a central unit which receives the RF signals and identified the object from the received signals.

SUMMARY OF THE INVENTION

An aspect of some embodiments of the present invention is the provision of systems and methods for communicating with a plurality of objects situated on digitizer tablet to at least determine identification and position of objects.

An aspect of some embodiments of the present invention is the provision of a digitizer system comprising: at least one object incorporating an electronic tag configured for radiating at least one modulated signal and at least one second signal; a digitizer sensor configured for detecting the at least one second signal while the object is positioned on or over the digitizer sensor; and circuitry configured for identifying the object based on modulation of the at least one modulated signal and for determining a position of the object on or over the digitizer based on the detected second signal on a portion of the digitizer sensor.

Optionally, the system comprises an excitation coil surrounding the digitizer sensor, wherein the excitation coil is in electrical communication with the circuitry and is configured for triggering the electronic tag.

Optionally, the excitation coil is further configured for receiving the at least one modulated signal radiated by the electronic tag and transmitting the at least one modulated signal to the circuitry configured for identifying the object.

Optionally, the system comprises an antenna positioned in the vicinity of the digitizer sensor, wherein the antenna is configured for receiving the at least one modulated signal radiated by the electronic tag and transmitting the at least one modulated signal to the circuitry configured for identifying the object.

Optionally, the excitation coil is further configured for providing a triggering signal to a stylus interacting with the digitizer sensor.

Optionally, the triggering signal provided for the stylus is at a frequency that is lower than the frequency of the triggering signal provided for the electronic tag.

Optionally, the triggering signal for the stylus includes a pre-defined frequency band that is significantly wider than the frequency band applied to trigger the electronic tag.

Optionally, the system comprises a plurality of objects, each incorporating an electronic tag.

Optionally, the second signal is a signal common to at least a portion of the electronic tags.

Optionally, the at least one second signal is a modulated signal.

Optionally, the at least one modulated signal includes a binary code that comprises a stream of multiple bits.

Optionally, the modulated signal is modulated based on amplitude shift keying.

Optionally, the electronic tag comprises a resonance circuit and an integrated circuit, wherein the integrated circuit comprises a modulator circuit configured for generating the at least one modulated signal and memory unit for storing a code defining modulation of the at least one modulated signal.

Optionally, the memory unit is configured for storing information corresponding to the position of the at least one object on or over the digitizer sensor.

Optionally, the electronic tag comprises an envelope circuit configured for generating a 4 kHz modulated signal.

Optionally, the electronic tag comprises at least one dipole, wherein the dipole is configured for concentrating the transmitted signal around a tip.

Optionally, the dipole is configured for generating radiation having a high near electric field and wherein the digitizer sensor is configured for detecting electric fields.

Optionally, the electronic tag includes two dipoles spaced apart, wherein the two dipoles are configured for radiating signals with a phase shift between them.

Optionally, the circuitry is configured differentiating between the signals with a phase shift between them.

Optionally, the at least one object includes two electronic tags spaced apart.

Optionally, the electronic tag is a radio frequency identification tag.

Optionally, the at least one modulated signal represents an identification code configured for identifying the object.

Optionally, the system comprises a plurality of objects concurrently positioned on or over the digitizer sensor, each object incorporating the electronic tag.

Optionally, the digitizer sensor is additionally configured for detecting finger touch.

Optionally, the system comprises a display having an image that can be changed electronically, displayed thereon wherein the display underlies the digitizer sensor and wherein the digitizer sensor is substantially transparent.

Optionally, the digitizer sensor is a grid based sensor including horizontal and vertical conducting line.

Optionally, the digitizer includes conductive loops configured for detecting a magnetic field.

An aspect of some embodiments of the present invention is the provision of a method for detecting at least one an object on a digitizer sensor, the method comprising: placing at least one object on or over the surface of a digitizer sensor, wherein the at least one object includes an electronic tag; radiating at least two different signals by the electronic tag, at least one of which is a modulated signal;

detecting the modulated radiation; identifying the at least one object from a modulation of the modulated signal; detecting the second signal with the digitizer sensor; and determining a position of the at least one object on or over the surface of the digitizer sensor based on the detection of the second signal.

Optionally, the method comprises triggering the electronic tag with an excitation coil surrounding the digitizer sensor.

Optionally, the method comprises detecting the modulated signal with the excitation coil.

Optionally, the method comprises detecting the modulated signal with antenna positioned in the vicinity of the digitizer sensor.

Optionally, the method comprises concurrently triggering the electronic tag and a stylus interacting with the digitizer sensor.

Optionally, the method comprises the triggering signal provided for the stylus is at a frequency that is lower than the frequency of the triggering signal provided for the electronic tag.

Optionally, the method comprises the triggering signal for the stylus includes a pre-defined frequency band that is significantly wider than the frequency band applied to trigger the electronic tag.

Optionally, the method comprises placing a plurality of objects on or over the surface of the digitizer sensor, each incorporating the electronic tag; and detecting position based on the detection of the second signal.

Optionally, the second signal is a signal common to at least some of the electronic tags.

Optionally, the at least one second signal is a modulated signal.

Optionally, the at least one modulated signal includes a binary code that comprises a stream of multiple bits.

Optionally, the modulated signal is modulated based on amplitude shift keying.

Optionally, the electronic tag includes memory capability.

Optionally, the memory unit is configured for storing information corresponding to the position of the at least one object on or over the digitizer sensor.

Optionally, the electronic tag is configured for generating a 4 kHz modulated signal.

Optionally, the electronic tag comprises at least one dipole, wherein the dipole is configured for concentrating the transmitted signal around a tip.

Optionally, the dipole is configured for generating radiation having a high near electric field and wherein the digitizer sensor is configured for detecting electric fields.

Optionally, the electronic tag includes two dipoles spaced apart, wherein the two dipoles are configured for radiating signals with a phase shift between them.

Optionally, the method comprises determining orientation of the object based on the signals radiated from the two dipoles spaced apart.

Optionally, the at least one object includes two electronic tags spaced apart.

Optionally, the electronic tag is a radio frequency identification tag.

Optionally, the modulated signal represents an identification code configured for identifying the object.

Optionally, the method comprises positioning a display having an image that can be changed electronically, displayed thereon under the digitizer sensor, wherein the digitizer sensor is substantially transparent.

Optionally, the digitizer sensor is a grid based sensor including horizontal and vertical conducting line.

An aspect of some embodiments of the present invention is the provision of a digitizer system comprising: at least one object incorporating an electronic tag configured for radiating at least one modulated signal at least partially in the form of an electric field; a digitizer sensor configured for detecting the electric field radiated from the at least one electronic tag when positioned on or over the digitizer sensor; and circuitry configured for identifying the object based on modulation of the modulated signal and for determining a position of the object on the digitizer based on the detected electric field on a portion of the digitizer sensor.

Optionally, the at least one modulated signal is detected by the digitizer sensor.

Optionally, the at least one modulated signal is implemented to identify the at least one object and determine its position on the digitizer sensor.

Optionally, the system comprises a coil in electrical communication with the circuitry, wherein the coil is configured for detecting the modulated signal.

Optionally, the modulated signal includes a binary code that comprises a stream of multiple bits.

Optionally, the electronic tag is configured for radiating at least one second signal other than the at least one modulated signal.

Optionally, the at least one second signal is a modulated signal.

Optionally, the system comprises a plurality of objects, each incorporating an electronic tag.

Optionally, the at least one second signal is a signal common to at least some of the electronic tags incorporated in the plurality of objects.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
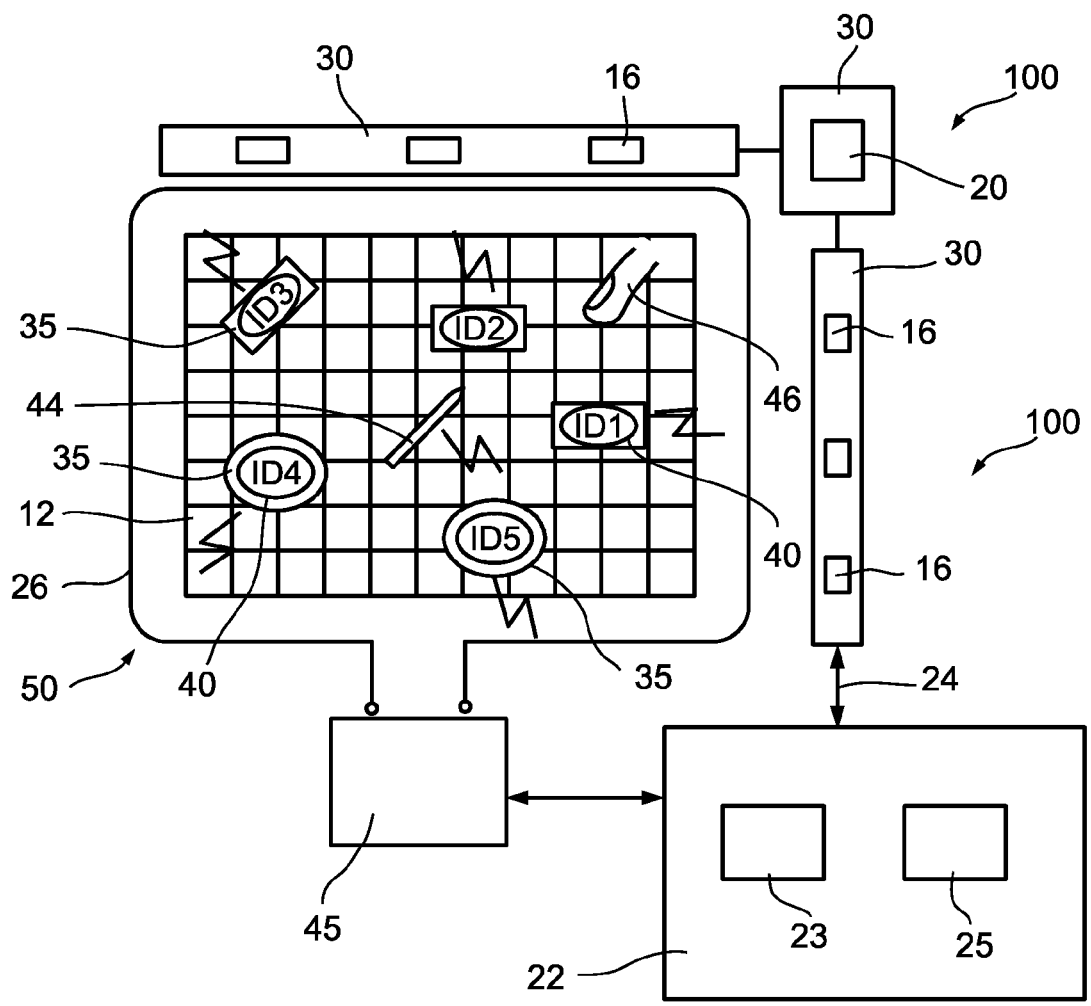
FIGS. 1A and 1B show two exemplary simplified block diagrams of a digitizer system integrated with an electronic tag system in accordance with some embodiments of the present invention.

The present invention, in some embodiments thereof, relates to digitizing tablet systems and more particularly, but not exclusively, to multiple object detection on digitizing tablet systems.

An aspect of some embodiments of the present invention is the provision of systems and methods for integrating an RFID system, electronic tag system, and/or a transponder system with a digitizing system. According to some embodiments of the present invention, the integration facilitates multiple objects interacting with the digitizer and optionally communication with objects positioned around the digitizer surface. According to some embodiments of the present invention, one or more electronic tags positioned on the digitizer sensor radiate a modulated signal. In some exemplary embodiments, the modulated signal includes information that identifies the object. According to some embodiments of the present invention the modulated signal is detected by an antenna in proximity to the digitizer sensor. In some exemplary embodiments the modulated signal is detected by the digitizer sensor, e.g. conductive lines of the digitizer sensor. According to some embodiments of the present invention, the one or more electronic tags positioned on the digitizer sensor radiate a second signal that is detected by the digitizer sensor and used to determine position of the electronic tag on the digitizer sensor. According to some embodiments, the second signal is at least partially in the form of an electric field. According to some embodiments, the modulated signal is in the form of a magnetic field. According to some embodiments, the second signal is also a modulated signal. According to some embodiments, the second signal is common to more than one electronic tag on the digitizer sensor and is selected to enable robust detection by the digitizer sensor.

According to some embodiments of the present invention, the digitizer system is capable of detecting elements such as electromagnetic stylus, RFID tags, finger touch and other conductive objects positioned on the digitizer concurrently. According to some embodiments of the present invention, each of the multiple objects used for interaction with the digitizer houses a transponder and/or electronic tag, e.g. RFID tag. According to some embodiments, all the tags resonate and/or transmit at a common frequency and/or common frequency band and are distinguishable by radiating a pre-stored identification code, e.g. a modulated signal, at that frequency or in that frequency band. In some embodiments the exact frequency of radiation within the frequency band is not utilized in the identification. In others it is.

According to some embodiments of the present invention, communication between the objects and the digitizer sensor or other parts of the system facilitates identifying the presence of objects on, over and/or around the digitizer sensor, determining position of the object on or over the digitizer sensor, determining orientation of an object on the digitizer sensor, reading information, e.g. different codes, stored in the electronic tag of a particular object and/or transmitting information to be stored by the electronic tag of a particular object. Optionally, such communication facilitates requesting that a particular object radiate a specific modulated signal stored in its memory. According to embodiments of the present invention, the RFID system can be integrated with any digitizer sensor capable of detecting EM based user interactions.

In some embodiments, the electronic tag loads the RF field generated by the reader (and/or circuitry that includes functionality of the reader) and thereby creates a modulation. Typically, the electronic tag includes a resonant circuit for loading the RF field electrically connected to an IC. Typically, the IC circuit includes a modulating circuit to generate a modulated signal based on stored information. Typically, the IC includes memory capability, e.g. FLASH memory. Optionally more than one modulation code is stored in the IC, e.g. in the IC memory. Typically the IC circuit stores the tags identification data, e.g. binary codes and other related data. In response to a query, the RFID tag returns a signal containing a packet of information that is received and decoded. The different codes may be selected for radiation based on queries transmitted to the electronic tag. Radiation from the electronic tag can be picked up with an excitation coil surrounding the digitizer sensor, a dedicated antenna and/or by the digitizer sensor itself. According to some embodiments of the present invention, the electronic tag is an RFID tag.

According to some embodiments of the present invention, the electronic tag includes a dipole to concentrate the transmitted signal around a tip toward the digitizer sensor and to convert the radiation to an electric field. Concentrating the transmitted signal around the tip pointing in the direction of the digitizer may enable improved detection of the tags position and/or improved detection of the signal transmitted to the digitizer sensor. According to embodiments of the present invention, extracting the electric field from the electromagnetic field enables and/or improves detection of the signal by digitizer sensors that include conductive lines with high impedance.

According to some embodiments of the present invention, the dipole limits reception of transmitted signal to reception by the digitizer sensor (and not by surrounding antennas). In some exemplary embodiments, a dipole facilitates establishing a private communication channel through the digitizer sensor that cannot be easily intercepted.

According to some embodiments of the present invention, the RFID tag includes one or more filters for generating an envelope of the modulated signal thereby providing a lower modulation frequency signal that can be detected by the digitizer sensor. Typically, the digitizer sensor operates in a low frequency band. Optionally, the RFID tag is a powered and/or battery assisted tag.

According to some embodiments of the present invention, the electronic tags radiate signals using a narrow frequency bandwidth. By identifying the different tags based on a coded modulated signal instead of by the different resonant frequencies, the number of objects that may concurrently interact with the digitizer sensor can be significantly increased. Multiple object identification may be useful for example in electronic game-board applications and/or position based authentication system. In one exemplary embodiment modulation is by Amplitude Shift Keying (ASK).

According to some embodiments of the present invention, the digitizer system includes an excitation coil surrounding the digitizing sensor capable of transmitting a triggering signal to one or more of the electronic tags. According to some embodiments of the present invention, the excitation coil simultaneously transmits a triggering signal to all electronic tags present over a defined area. According to some embodiments of the present invention, the excitation coil is also configured for transmitting signals to one or more specified electronic tags. Optionally, the excitation coil can trigger electronic tags that are not on the digitizer sensor but that are in the vicinity of the digitizer sensor. According to some embodiments of the present invention, the excitation coil is capable of simultaneously transmitting a plurality of triggering signals, each transmitted with a different frequency. In some exemplary embodiments, the excitation coil is capable of transmitting a triggering pulse to a stylus and to the electronic tags simultaneously. Typically, the frequency used to trigger the stylus is different, e.g. lower, and with a wider frequency band than the frequency used to trigger the electronic tags.

According to some embodiments of the present invention the excitation coil can additionally functions as a receiver, operating as a transceiver for both transmitting and receiving signals from one or more electronic tags.

According to some embodiments of the present invention, the digitizer system communicates with the electronic tags via an antenna and/or coil surrounding the digitizer sensor and/or via the conductive lines of the digitizer sensor. Typically, communication via the conductive lines is via electric fields while communication with the antenna and/or coil surrounding the digitizer sensor is via magnetic field.

According to some embodiments of the present invention, signals transmitted by the electronic tag are received and/or picked up by one or more conductive lines of the digitizer sensor. According to some embodiments of the present invention, the digitizer sensor is implemented to determine a position of electronic tag based on a signal transmitted by the electronic tag. For example, based on a query transmitted by the excitation coil, an electronic tag responds and the response signal is picked-up by the digitizer sensor and the position of the electronic tag on the digitizer sensor is detected. Position detection is based on known methods for detecting positions of Electro-Magnetic (EM) based user interactions on a digitizer. According to some embodiments of the present invention a modulation code other then the code used for identifying the electronic tag is used to response to a position query. According to some embodiments of the present invention, the code used for positioning is common to at least some of the electronic tags positioned on the digitizer sensor. Typically, an electronic tags is identified first prior to requesting position so that the position can be associated with the identified tag. Typically, once an electronic tag is identified, its position is requested using the identification, so that the position can be associated with the identified tag. Typically, identification of an object and its position is associated based on time of transmission. Typically, identification detection of an object is followed by its position detection.

According to some embodiments of the present invention, information other than position is detected by the digitizer sensor based on one or more codes stored in the IC of the electronic tag. In one exemplary embodiment, signals detected by the digitizer sensor are decoded, e.g. demodulated to extract information, e.g. identification and orientation, transmitted by the electronic tag. In some exemplary embodiments, the digitizer sensor is implemented for identifying one or more electronic tags positioned over the digitizer sensor. According to some embodiments of the present invention, the electronic tag is capable of communicating with a reader, e.g. and RFID reader via an antenna and/or coil proximal and/or surrounding the digitizer sensor and/or via the digitizer sensor, e.g. via conductive lines of the digitizer sensor operating as receiving antennas. In some exemplary embodiment, identification of the electronic tag is determined based on signal received by the antenna and/or coil surrounding the digitizer sensor while position of the tag is determined based on signals picked up by the digitizer sensor.

According to some embodiments of the present invention, information decoded by the reader is associated, linked and/or combined with information decoded by the digitizer sensor, e.g. based on time of transmission. For example, identification of an objected determined by a reader may be associated with a position of the object detected by the digitizer sensor. According to some embodiments of the present invention, the digitizer circuitry controls operation of both the reader and the digitizer sensor and links information obtained from each, based for example, on time of transmission and/or shape of the transmission. According to some embodiments of the present invention, a host computing device controls operation of both the reader and the digitizer sensor and links information obtained from each, based for example, on time of transmission and/or shape of the transmission.

Optionally, objects used for interaction with the digitizer may include pointing devices, e.g. EM styluses, Integrated Circuit Cards (ICC), e.g. Smart Card, playing pieces and/or other devices.

According to some embodiments of the present invention, the digitizer sensor is implemented to determine an orientation of an electronic tag based on signals transmitted by the electronic tag. In some exemplary embodiments of the present invention, an object used for user interaction includes two dipoles spaced apart that transmit signals with a phase shift. In this example, the digitizer sensor detects the location of origin each of the signals transmitted as well as the phase shift between the signals. Detection of the phase shift enables differentiating between the two dipoles. Based on the two point detection, the orientation of the object is determined.

Figure 1B:
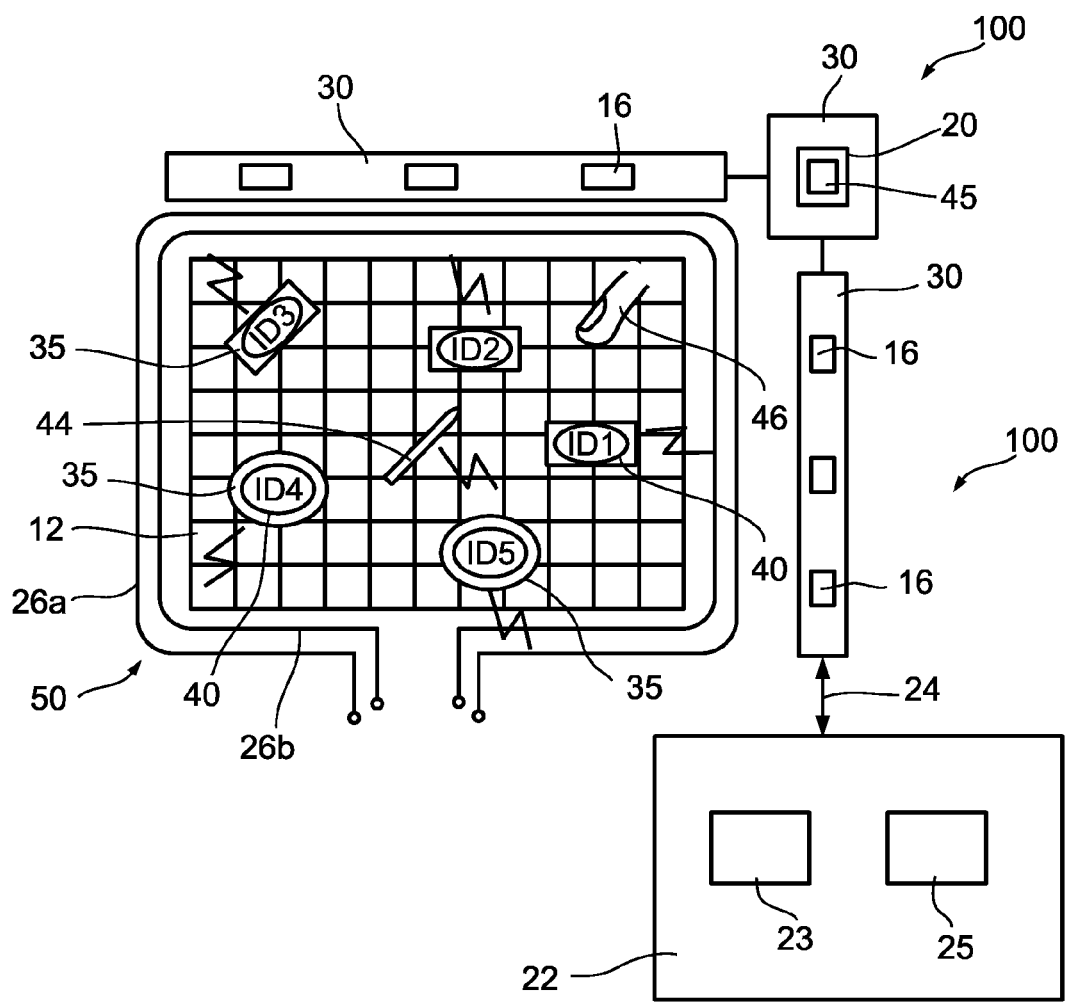

Referring now to the drawings, FIGS. 1A and 1B illustrate two exemplary simplified circuit/block diagrams of a digitizer system in accordance with some embodiments of the present invention. The digitizer system 100 shown in FIGS. 1A and 1B may be suitable for any computing device that enables interactions between a user and the device, e.g. mobile computing devices that include, for example, FPD screens. Examples of such devices include Tablet PCs, pen enabled lap-top computers, tabletop computer, PDAs or any hand held devices such as palm pilots and mobile phones or other devices that facilitate electronic gaming. According to some embodiments of the present invention, the digitizer system comprises a sensor 12 including a patterned arrangement of conducting lines, which is optionally transparent, and which is typically overlaid on a FPD 10. Typically sensor 12 is a grid based sensor including horizontal and vertical conducting lines.

According to some embodiments of the present invention, circuitry is provided on one or more PCB(s) 30 positioned around sensor 12. According to some embodiments of the present invention, one or more ASICs 16 comprises circuitry to sample and process the sensor's output into a digital representation. The digital output signal is forwarded to a digital unit 20, e.g. digital ASIC unit, for further digital processing. According to some embodiments of the present invention, digital unit 20 together with ASIC 16 serves as the controller of the digitizer system and/or has functionality of a controller and/or processor. Output from the digitizer sensor is forwarded to a host 22 via an interface 24 for processing by the operating system or any current application.

According to some embodiments of the present invention, digital unit 20 together with ASIC 16 include memory and/or memory capability. Memory capability may include volatile and/or non-volatile memory, e.g. FLASH memory. In some embodiments of the present invention, the memory unit and/or memory capability, e.g. FLASH memory is a unit separate from the digital unit 20 but in communication with digital unit 20.

According to some embodiments of the present invention, sensor 12 comprises a grid of conductive lines made of conductive materials, optionally Indium Tin Oxide (ITO), patterned on a foil or glass substrate. The conductive lines and the foil are optionally transparent or are thin enough so that they do not substantially interfere with viewing an electronic display behind the lines. Typically, the grid is made of two layers, which are electrically insulated from each other. Typically, one of the layers contains a set of equally spaced parallel conductors and the other layer contains a set of equally spaced parallel conductors orthogonal to the set of the first layer. Typically, the parallel conductors are input to amplifiers included in ASIC 16. Optionally the amplifiers are differential amplifiers.

Typically, the parallel conductors are spaced at a distance of approximately 2-8 mm, e.g. 4 mm, depending on the size of the FPD and a desired resolution. Optionally the region between the grid lines is filled with a non-conducting material having optical characteristics similar to that of the (transparent) conducting lines, to mask the presence of the conducting lines. Optionally, the ends of the lines remote from the amplifiers are not connected so that the lines do not form loops. In this case the lines act as high impedance electric field receiving antennas.

Typically, ASIC 16 is connected to outputs of the various conductors in the grid and functions to process the received signals at a first processing stage. As indicated above, ASIC 16 typically includes an array of amplifiers, e.g. differential amplifiers, to amplify the sensor's signals. Additionally, ASIC 16 optionally includes one or more filters to remove frequencies that do not correspond to frequency ranges used for excitation and/or obtained from objects used for user interactions. Optionally, filtering is performed prior to sampling. The signal is then sampled by an A/D, optionally filtered by a digital filter and forwarded to digital ASIC unit, for further digital processing. Alternatively, the optional filtering is fully digital or fully analog. In some exemplary embodiments, signals ranging between 4-125 KHz can be detected by the digitizer sensor.

According to some embodiments of the invention, digital unit 20 receives the sampled data from ASIC 16, reads the sampled data, processes it and determines and/or tracks the position of physical objects, such as stylus, electronic tag, and/or finger, touching the digitizer sensor from the received and processed signals. According to some embodiments of the present invention, digital unit 20 determines the presence and/or absence of physical objects, such as stylus, and/or finger over time. In some exemplary embodiments of the present invention hovering of an object, e.g. stylus, finger and hand, is also detected and processed by digital unit 20. Optionally, hovering and touching elements are differentiated from the signals received, as is known in the art, for example by signal strength. Calculated position is sent to the host computer via interface 24.

According to some embodiments, digital unit 20 produces and controls the timing and sending of a triggering pulse to be provided to an excitation coil 26 that surrounds the sensor arrangement and the display screen. The excitation coil provides a trigger pulse (in the form of an electric or electromagnetic field) that excites passive circuitry in a stylus or other object used for user interaction to produce a response from the stylus that can subsequently be detected.

According to some embodiments of the present invention, one or more objects 35, interacting with the digitizer include an electric tag 40. According to some embodiments of the present invention, electronic tag 40 is an RFID tag. Typically, each electronic tag 40 includes a unique identification code stored in memory that may be transmitted in response to a received excitation signal and/or command excitation signal. According to some embodiments, reader 45, e.g. RFID reader, produces and manages a triggering pulse to be provided to an excitation coil 26 that surrounds the sensor arrangement and the display screen for interrogating one or more electronic tags. According to some embodiments, functionality of reader 45 is integrated in digital unit 20 (FIG. 1B) and/or in host computer 22. In one exemplary embodiment reader 45 is implemented to manage triggering pulses to both passive and active styluses and/or fingers and electronic tags 40. The excitation coil provides a trigger pulse (in the form of an electric or electromagnetic field) that may prompt the electronic tag 40 to transmit a specified modulated signal stored in the electronic tag's memory. According to some embodiments, one or more stylus(es) 44 and finger(s) 46 interacts with digitizer sensor 12, e.g. interact together with one or more objects 35 including electronic tags 40.

According to some embodiments of the present invention, excitation coil 26 functions as a receiving antenna for receiving modulated signals transmitted by one or more electronic tags 40 over air. According to some embodiments of the present invention, reader 45 is implemented to decode signals acquired by excitation coil 26. According to some embodiments of the present invention, digitizer system 100 includes an excitation coil 26A and that is separate from a receiving antenna 26B (FIG. 1B) both surrounding the sensor arrangement and the display screen in communication with reader 45 and/or circuitry, e.g. digital unit 20,. According to some embodiments of the present invention, the conductive lines of the sensor functions as a receiving antenna for receiving modulated signals transmitted by one or more electronic tags 40. Optionally non-coil receiving antennas are used.

According to some embodiments, digital unit 20 produces and sends a triggering pulse to at least one of the conductive lines. Typically the triggering pulses and/or signals are analog pulses and/or signals. According to some embodiments of the present invention, the triggering pulse and/or signal implemented may be confined to one or more predefined frequencies, e.g. 18 KHz or 20-40 KHz.

According to some embodiments of the invention, host 22 includes at least a memory unit 23 and a processing unit 25 to store and process information obtained from ASIC 16, digital unit 20, and reader 45. Memory and processing capability is also generally included in digital unit 20, ASIC 16 and reader 45. According to some embodiments of the present invention memory and processing functionality may be divided between any two, three, or four of host 22, digital unit 20, and ASIC 16, and reader 45 or may reside in only one of them and/or may be a separated unit connected to at least one of host 22, reader 45, digital unit 20, and ASIC 16. According to some embodiments of the present invention, one or more tables and/or databases may be stored to record one or more outputs, e.g. images or patterned outputs of sensor 12, sampled by ASIC 16 and/or digitizer unit 20. In some exemplary embodiments, a database of sampled output signals may be stored. Data and/or signal values may be stored in volatile and nonvolatile memory. According to some embodiments of the present invention, data and/or signal values may be stored as tables of spatial output of the digitizer sensor and/or differential amplifier output of the digitizer sensor. According to some embodiments of the present invention outputs are recorded after, e.g. after low pass and/or band-pass filtering to select outputs from frequency ranges corresponding outputs from objects used for user interaction, e.g. outputs from a frequency range corresponding to finger detection.

According to some embodiments of the present invention the digitizer system may include one or more digitizers associated with a single host 22. In some exemplary embodiments each digitizer 50 includes at least the digitizer sensor 12, ASIC units 16 and digital unit 20.

Digitizer systems used to detect stylus and/or finger tip location may be, for example, similar to digitizer systems described in incorporated U.S. Pat. Nos. 6,690,156, 7,292, 229 and/or U.S. Patent Application Publication No. 2004/0155871. It will also be applicable to other digitized systems known in the art, depending on their construction.

Figure 2A:
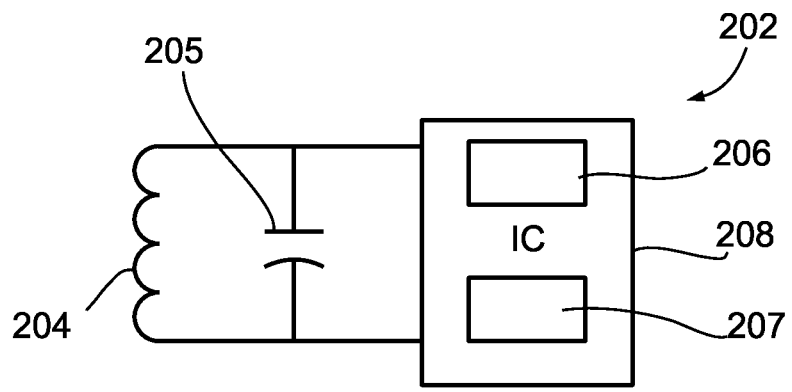
FIGS. 2A and 2B show two simplified circuit/block diagrams of exemplary electronic tags capable of communicating over air and via the digitizer sensor in accordance with some embodiments of the present invention.
Figure 2B:
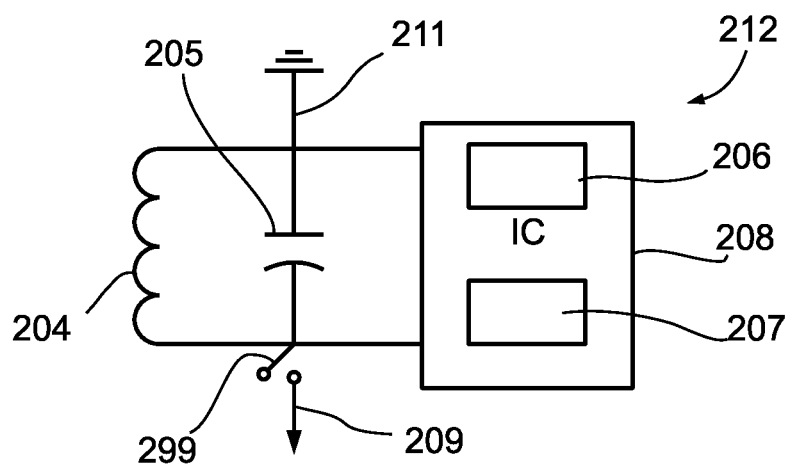

Reference is now made to FIGS. 2A and 2B showing two exemplary electronic tags capable of communicating over air and via the digitizer sensor in accordance with some embodiments of the present invention.

According to some embodiments of the present invention, electronic tag 202 comprises a passive resonance radio frequency (RF) circuit, such as a coil 204 and a capacitor 205 which together forms a resonant circuit with a predetermined resonant frequency, wherein the selected radio frequency determined by the values of the coil and the capacitor. Optionally, the coil is wounded around a ferrite, in order to facilitate magnetic flux concentration. This vastly increases the inductance, so that the coil is small and suitable for the desired device size. Further more, the tag 202 includes an Integrated Circuit (IC) 208 for providing "intelligence" to the tag 202 and memory capability, e.g. with memory unit 206. The IC 208 is electrically connected to the resonant circuit. Typically, the IC circuit stores the tag's identification data and other related data and outputs a data stream comprised of the stored data when sufficient power from the resonance circuit is applied thereto. According to some embodiments of the present invention, electronic tag 202 is active or semi-passive tag and includes a power source.

In response to a triggering signal, the tag 202 returns a signal containing a packet of programmed information (data). According to some embodiments of present invention, the packet of information, e.g. the data pulses is received over air by excitation coil 26 (FIG. 1) or other receiving antenna and processed by the reader 45 and is decoded to provide identification information of the tag 202 and/or other data. According to some embodiments of the present invention, signals from electronic tag 202 is received by one or more of conductive lines of digitizer sensor 12 and are processed by ASICs 16, digital unit 20 and/or reader 45.

According to some embodiments of the present invention, IC circuit 208 includes a modulator circuit 207 and memory unit 206. In some exemplary embodiments, modulation is achieved with a resistor connected in parallel to the resonance circuit by a switch which is controlled by the modulator circuit 207. The addition of the extra resistor reduces the Q factor of the resonance circuit and loads the excitation coil signal. In one exemplary embodiment, a power circuit converts the AC signal of the resonance circuit into a DC signal to power the modulator circuit.

According to some embodiments of the present invention, memory unit 206 stores a unique identification code for identifying the tag. Optionally, memory unit 206 stores a code that is used for position detection on the digitizer sensor. Optionally, memory unit 206 facilitates storing history tracking of the tag's position over the digitizer sensor. Optionally, memory unit 206 facilitates storing points and/or money allocation and/or history tracking of points and/or money allocation for that tag.

In FIG. 2B, electronic tag 212 additionally includes a pair of conductive elements, e.g. first conductive element 209 and second conductive element at a reference potential 211, to form a dipole. According to some embodiments, the first conductive element 209 of the pair is connected to one pole of the resonance circuit, and is implemented to transfer the tag signal, wherein the second conductive element 211 is connected to the opposite pole and serves as reference voltage, e.g. to ground. According to embodiments of the present invention, conductive element 209 forms a tip and facilitates concentrating a signal transmitted from tag 212 over a defined area, e.g. around the tip of conductive element 209. As a result, the tag signal is received on the conductive lines closest to the tag's and/or tag's tip position which enables the tag's position detection. According to some embodiments of the present invention, transmitting the tag's signal through a dipole facilitates deciphering a position of origin of the transmitted signal on the digitizer sensor 12 so that an accurate position of the tag on the digitizer sensor can be detected. Optionally, a switch 299 is included to control activation of the dipole. Typically, control of the switch is initiated by a command transmitted to the electronic tag. Optionally, the material used for the conductive elements 209 and 211 is copper. In some exemplary embodiments, conductive element 209 forms a shape other than a tip at its distal end. According to some embodiments of the present invention, the dipole may be similar to that described in incorporated U.S. Pat. No. 7,292,229 assigned to the common assignee.

Figure 3A:
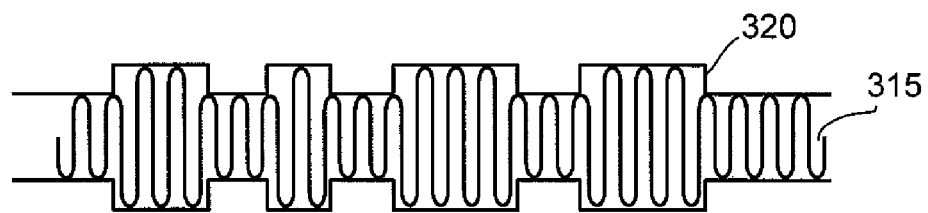
FIG. 3A shows an exemplary ASK modulated signal obtained from an electronic tag in accordance with some embodiments of the present invention.

Reference is now made to FIG. 3A showing an exemplary ASK modulated signal obtained from an electronic tag in accordance with some embodiments of the present invention. FIG. 3A illustrates an example of an ASK modulated signal 315, wherein the amplitude of the carrier signal varies in accordance with the bit stream, e.g. modulated signal, while keeping frequency and phase constant. Typically, the modulated signal outputted by the electronic tag is of a narrow frequency band. In some exemplary embodiments, ASK is achieved with a relatively small change in amplitude. The level of amplitude can be used to represent binary logic 0s and 1s. In some exemplary embodiments, the envelope 320 of the modulated signal comprises the data, e.g. an identification code of the electronic tag, while the carrier signal 315 is at the resonance circuit predetermined frequency, e.g. 125 KHz. The present invention in not limited to ASK modulation and can be applied to other modulation known to person skilled in the art, such as Frequency Shift Keying (FSK) and Phase Shift Keying (PSK). The present invention is not limited to LF band and can be applied to HF, UHF and other bands. According to some embodiments of the present invention, dipole formed by conductive elements 209 and 211 in electronic tag 224 are optional, e.g. the dipole is not included in the electronic tag.

Figure 3B:
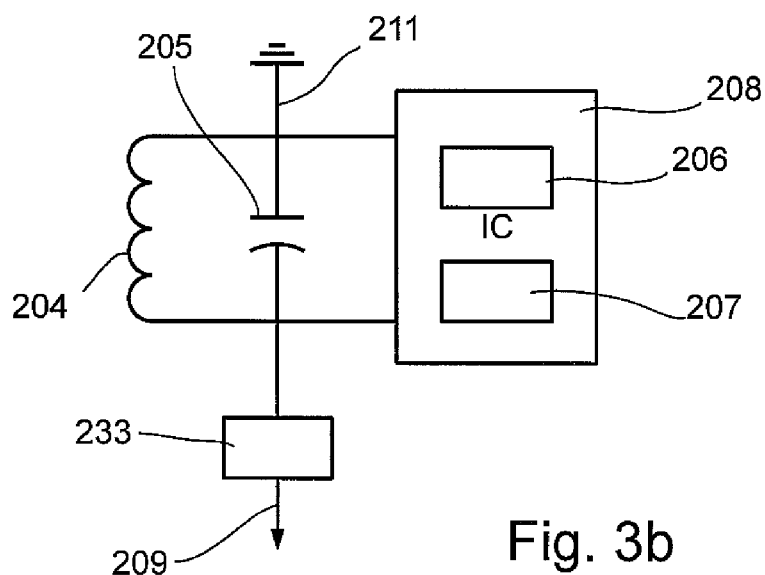
FIG. 3B shows an exemplary tag including an envelope circuit in accordance with some embodiments of the present invention.

Reference is now made to FIG. 3B showing an exemplary tag including an envelope circuit in accordance with some embodiments of the present invention. According to some embodiments of the present invention, electronic tag 224 is similar to tag 212 and further includes a modulation detector 233. The signal at the output of the modulation detector, e.g. through diode tip 209, includes the envelope data and not the carrier signal. Since the envelope signal has a lower frequency than the carrier signal, it can be detected by a digitizer hardware and/or digitizer sensor which is typically most sensitive to the envelope signal frequency.

Figure 3C:
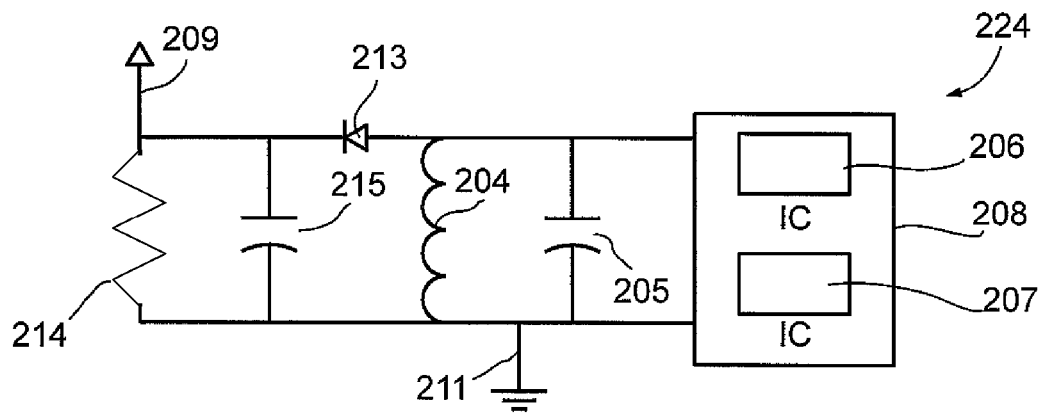
FIG. 3C shows a simplified circuit/block diagram of an exemplary tag capable of outputting a signal for representing binary logic 0s and 1s using ASK in accordance with some embodiments of the present invention.

Reference is now made to FIG. 3C showing an exemplary tag capable of outputting a signal for representing binary logic 0s and 1s using ASK in accordance with some embodiments of the present invention. According to some embodiments of the present invention, enveloping circuit 233 comprises a diode 213, optional capacitor 215 and resistor 214. Typically resistor 214 has a low resistance, e.g. 200 KΩ and a capacitance of approximately 500 pF, for 4 KHz data rate. In operation, when the amplitude of the modulated signal is high, e.g. above the ON voltage of diode 213, current flows through the diode and charges capacitor 215. When the amplitude of the modulated signal is low (below ON voltage of diode 213), no current flows through the diode and the capacitor 215 is discharged slowly through the resistor.

According to some other exemplary embodiments, the modulation can be of even higher complexity, e.g. tags signal that comprises two sub-carriers when using ISO 15693 a High-frequency RFID standard. In some exemplary embodiments, enveloping is performed at a pre-defined operating frequency band.

According to some embodiments of the present invention, electronic tags 202, 212 and 224 include Read Only (RO), Write Once/Read Many (WORM), or Read/Write (RW) capability. In one exemplary embodiment, RW RFID work-in-process system is integrated with the digitizer system. In such a case the RFID tag transmits a set of instructions to a reader, e.g. reader 45, and in response the reader 45 reports its performance to the tag. This encoded data would then become part of the electronic tags history. The data is burned to flash memory typically included in IC circuit of the tag. In some exemplary embodiment, communication with the tag is via the conductive lines of the digitizer sensor 12.

Figure 4:
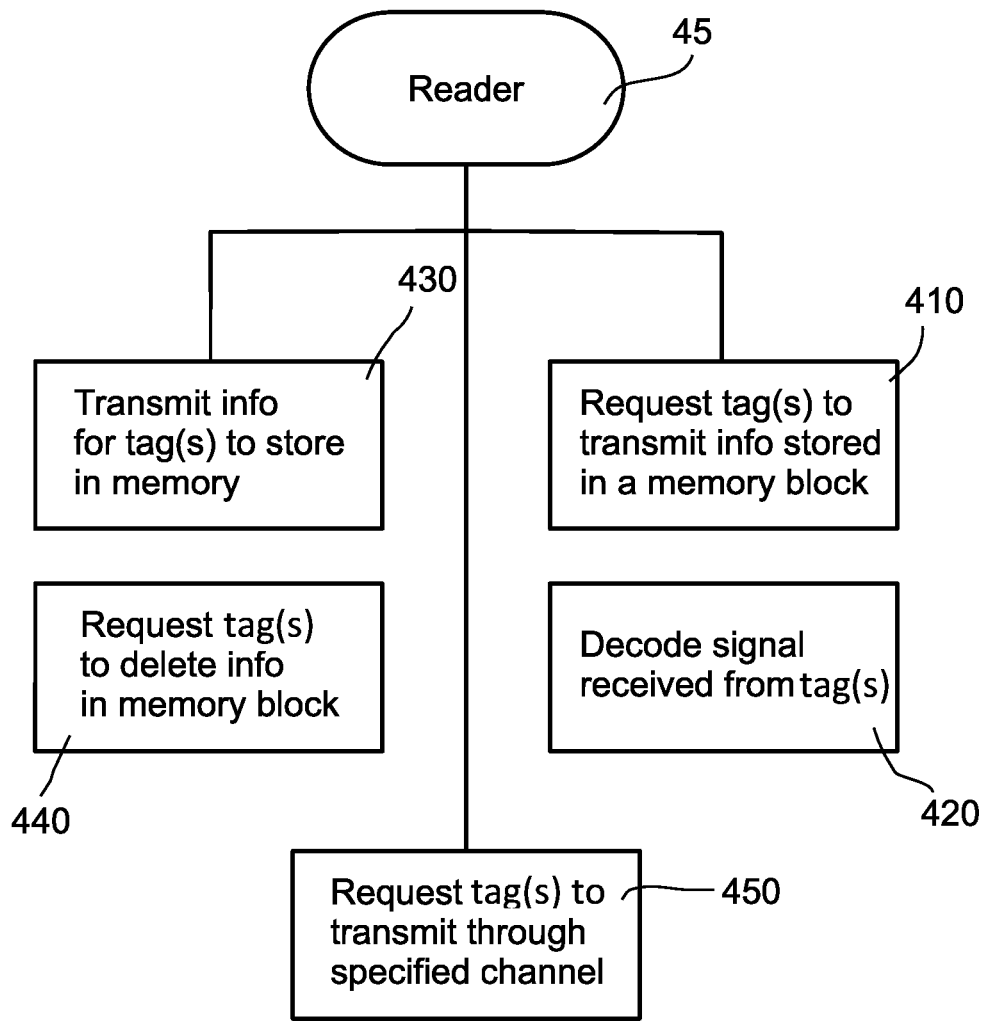
FIG. 4 shows optional functionalities of a reader in accordance with some embodiments of the present invention.

Reference is now made to FIG. 4 which schematically shows optional functionalities of reader 45 in accordance with some embodiments of the present invention. According to some embodiments of the present invention, reader 45 communicates with one or more tags using excitation coil 26 that typically surrounds digitizer sensor 12 (FIG. 1) and/or through the conductive lines of the digitizer sensors. Accordance with some embodiments, using a transmitting and/or receiving antenna that surrounds an area where the electronic tags are positioned improves good transmission and reception from tags situated on and/or around the digitizer sensor. According to other embodiments of the present invention, reader 45 communicates with one or more tags using one or more dedicated antenna other than excitation coil 26. In some exemplary embodiments, the dedicated antennas surround digitizer sensor 12.

According to some embodiments of the present invention, reader 45 requests that one or more electronic tags 40 transmit information stored in a memory block of the electronic tag (block 410). In some exemplary embodiments, the information is an identification signal and/or part of an identification signal. In some exemplary embodiments, the information is a pre-defined signal implemented for detection of a position of the object associated with the electronic tag. In some exemplary embodiments, the information includes a game score of the player associated with the object including the electronic tag. In some exemplary embodiments, the information includes a previous position and/or score of the player associated with the object. Typically, the information is in the form of a modulated signal. Typically, a binary code can be extracted from the modulated signal. According to some embodiments of the present invention, reader 45 decodes the signal received form the tag (block 420).

According to some embodiments of the present invention, reader 45 transmits a command and information, e.g. a modulated signal, to be stored in a specified memory block of the electronic tag (block 430). Alternatively, reader 45 may transmit a command to delete information stored in a memory block of one or more electronic tags (block 440). For example, reader 45 may transmit a command for a specified electronic tag to update its score in a game, or to update information on its current position on the digitizer sensor. Optionally, reader 45 may request that a specified electronic tag delete data regarding a bonus point associated with the tag.

According to some embodiments of the present invention, reader 45 sends a command to the electronic tag to transmit specified information through a specified channel, e.g. by air or through digitizer sensor conductive lines (block 450). For example, in response to the reader's command to transmit through the digitizer sensor, the electronic tag transmits response signal through a dipole. While in response to the reader's command to transmit by air, a switch 299 (FIG. 2B) of the electronic tag may be opened and the response signal is transmitted directly from coil 204.

Figure 5:
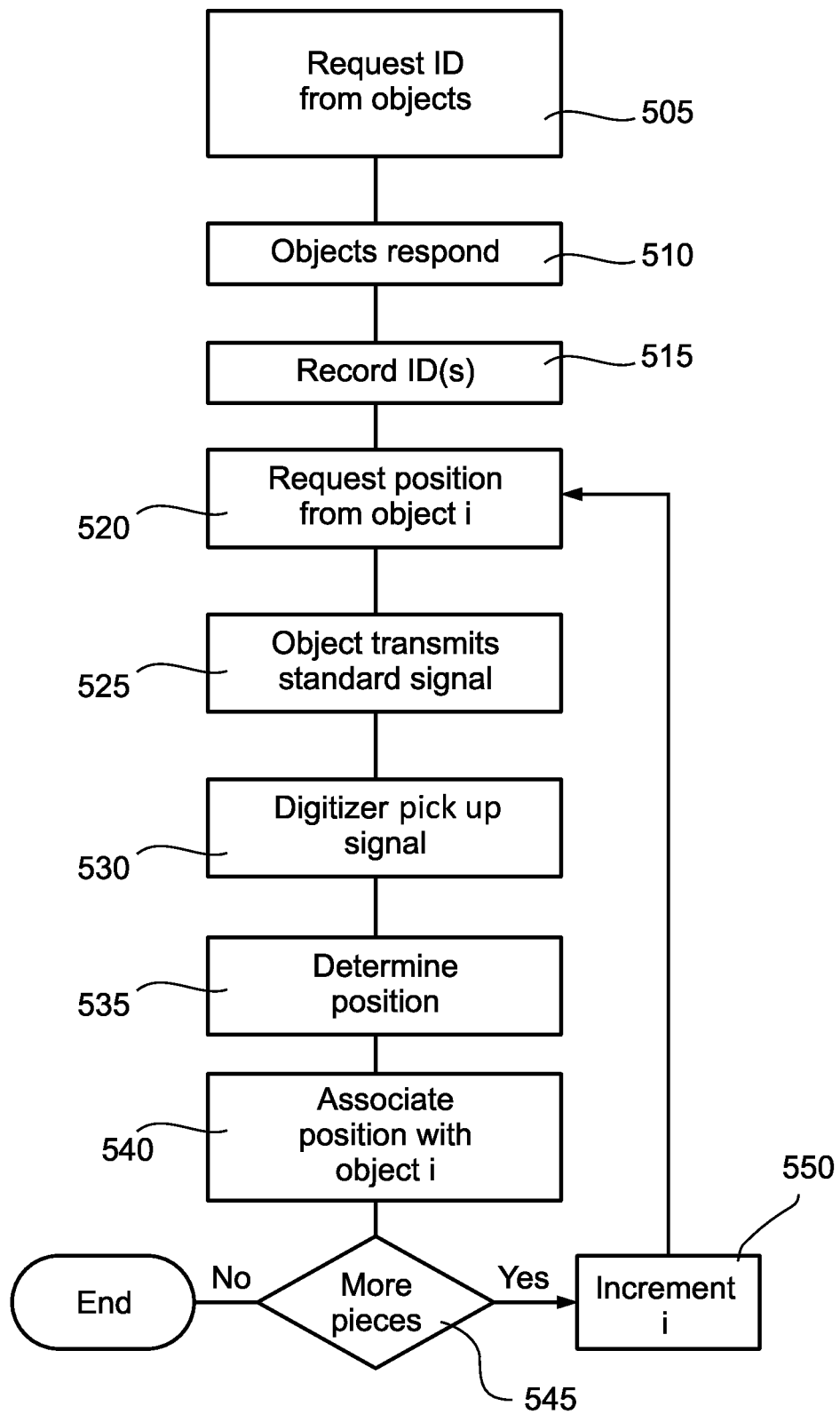
FIG. 5 shows a simplified flow chart of an exemplary method for determining positions of multiple objects over a digitizer sensor in accordance with some embodiments of the present invention.

Reference is now made to FIG. 5 showing a simplified flow chart describing an exemplary method for determining positions of multiple objects over a digitizer sensor in accordance with some embodiments of the present invention. According to some embodiments of the present invention, each object is associated with an electronic tag. According to some embodiments of the present invention, reader 45 requests identification code from one or more tags on the digitizer sensor and/or around the vicinity of the digitizer sensor (block 505). Tags within the field of the reader respond with their pre-defined identification code (block 510). Typically, each electronic tag has a unique identification code, e.g. a unique binary code.

According to some embodiments of the present invention, anti-collision algorithms are implemented to enable reader 45 to read more than one tag in the reader's field. For example a reader may request that all tags in its field transmit their binary identification code one bit at a time. When a first '1' is identified in one or more tags, the reader may continue to interrogate all tags where the '1' was identified to search for an additional '1' and the other tags which did not transmit '1' eliminate themselves for the rest of the iteration. In this manner the reader can search for the tag with the highest numerical identification code and then repeat the cycle to search for additional tags in descending numerical order until all tags in the reader's field are identified. Other anti-collision algorithms may be implemented, such as random based anti-collision algorithms. Typically, random based anti-collision algorithms are associated with a percent error but enable identifying a plurality of tags at faster rate.

According to embodiments of the present invention, the identification codes of the tags are recorded in memory for future reference, e.g. memory embedded in reader 45 (block 515). Based on the list of identified tags, the reader may request from one tag from the plurality identified, e.g. a first tag, to transmit a pre-defined position signal stored in the tag's memory (block 520). According to some embodiments of the present invention, the tag responds by transmitting a position signal stored in the tag's memory. Typically, the position signal is universal, e.g. common to all tags (block 525). Typically, a signal that produces the highest energy signal is chosen to facilitate robust detection of the signal by the digitizer sensor. In some exemplary embodiments, a modulated signal representing the binary code "01010101" is implemented. In some exemplary embodiments, a modulated signal representing the binary code "10101010" or '11001100' is implemented. Typically, modulated signals that produce a high energy in Discrete Fourier Transform (DFT) are implemented, e.g. a signal where a pure frequency can be detected. According to some embodiments of the present invention, the tags can implement one binary code from a selection, where each code represents a different frequency, e.g. 01010101 (4 KHz) and 00110011 (2 KHz). In such embodiments, tags implementing different binary codes can be located simultaneously. The present inventors have found that statistically, this may reduce position time detection, e.g. by a factor of two. In some exemplary embodiments, the signal is transmitted through a dipole so as to concentrate the transmitted signal over a defined area and close to the digitizer sensor. In other exemplary embodiments, a dipole is not used. The signal is then picked up by one or more conductive lines of the digitizer sensor (block 530) and the digitizer determines position of the tag on the digitizer sensor (block 535). According to some embodiments of the present invention, reader 45 receives position data from the digitizer 50 and records the position data for the tag identified (block 540). In some exemplary embodiments, reader 45 transmits position information of the tag to be stored in the tag's memory. In some exemplary embodiments, digitizer 20 and/or host computer 22 are responsible for coordinating information between the reader 45 and digitizer 50.

According to some embodiments of the present invention, reader 45 also identifies tags that are positioned around and/or in the vicinity of the digitizer sensor but not on the digitizer sensor. According to some embodiments of the present invention, a tag that is not on the digitizer sensor can be identified as such when in response to transmission of the position signal no position is detected by the digitizer sensor. In such a case, the tag is recorded as not being on the digitizer sensor. In some exemplary embodiments, the reader transmits information to be stored the tag's memory that indicates that the tag is not positioned on the digitizer sensor.

According to some embodiments of the present invention, once a first tag is located, the reader checks if there are more tags that were identified (block 545). If there were, the process is repeated sequentially for each tag identified, until all tags are located (block 550).

Figure 6:
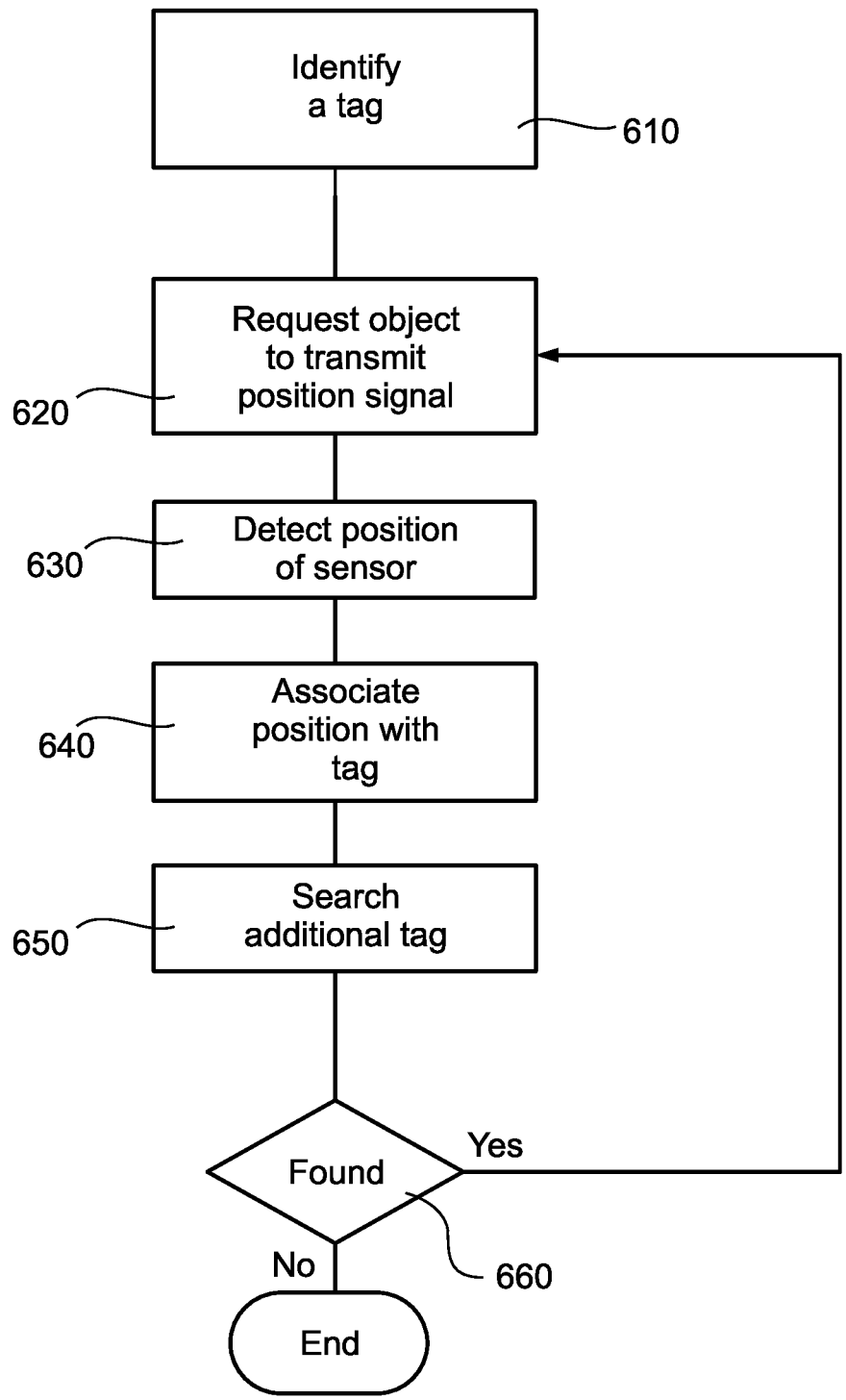
FIG. 6 shows a simplified flow chart of an alternate exemplary method for determining positions of multiple objects over a digitizer sensor in accordance with some embodiments of the present invention.

Reference is now made to FIG. 6 showing a simplified flow chart describing an alternate exemplary method for determining positions of multiple objects over a digitizer sensor in accordance with some embodiments of the present invention. According to some embodiments of the present invention, for each tag identified, position of that tag is determined prior to identifying additional tags. In some exemplary embodiments, a first tag in the field of reader 45 is identified using methods described in reference to FIG. 5 (block 610). Once a first tag is identified, reader 45 requests that the tag transmit a position signal (block 620). Digitizer 50 determines position of tag on the digitizer sensor based on the signals picked up by one or more of the conductive lines of the sensor 12 (block 630). The reader, digitizer and/or host associate the position determined with the identified tag (block 640). Optionally, reader 45 transmits position information to the tag for storage. Once position of the first tag is determined, reader 45 searches for more tags in its field (block 650). A query is made to determine if additional tags are found (block 660). If found blocks 620-650 are repeated until all identified tags are located. In some exemplary embodiments, reader 45 requests position information from one or more particular tag(s) as opposed to all tags within the reader's field. Typically, requesting position from more than one tag simultaneously, a bounding area of the tags' position can be determined.

Figure 7A:
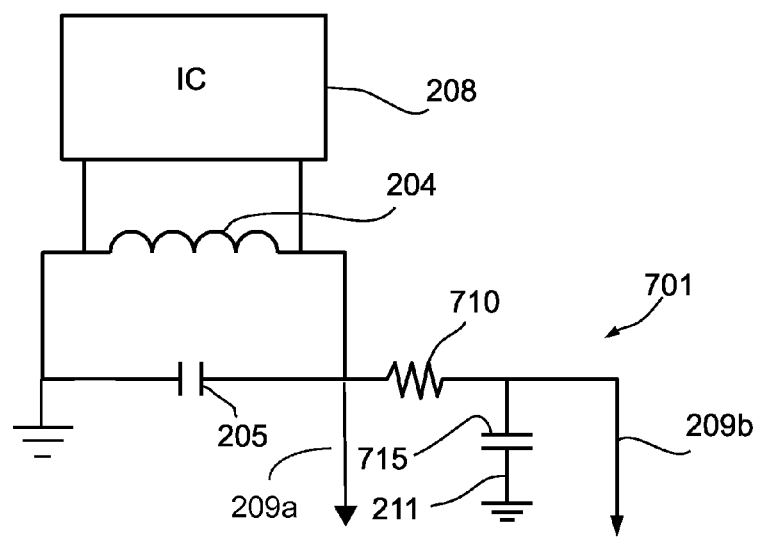
FIG. 7A shows a simplified block/circuit diagram of an exemplary electronic tag including two transmitting dipoles spaced apart in accordance with some embodiments of the present invention.

Reference is now made to FIG. 7A showing an exemplary electronic tag including two transmitting dipoles spaced in accordance with some embodiments of the present invention. According to some embodiments of the present invention, dipoles 209A and 209B are spaced apart at a pre-defined distance. According to some embodiments of the present invention, IC 208, resonant circuit including coil 204 and capacitor 205, and dipole 209A is similar to the electronic tag described in reference to FIG. 2B. Additional resistor 710 and capacitor 715 enables signals from dipole 209B to be transmitted at a phase shift with respect to signals transmitted from dipole 209A. In some exemplary embodiments, the phase shift is detected on the digitizer sensor and is used to distinguish between signals obtained from dipole 209A and 209B.

Figure 7B:
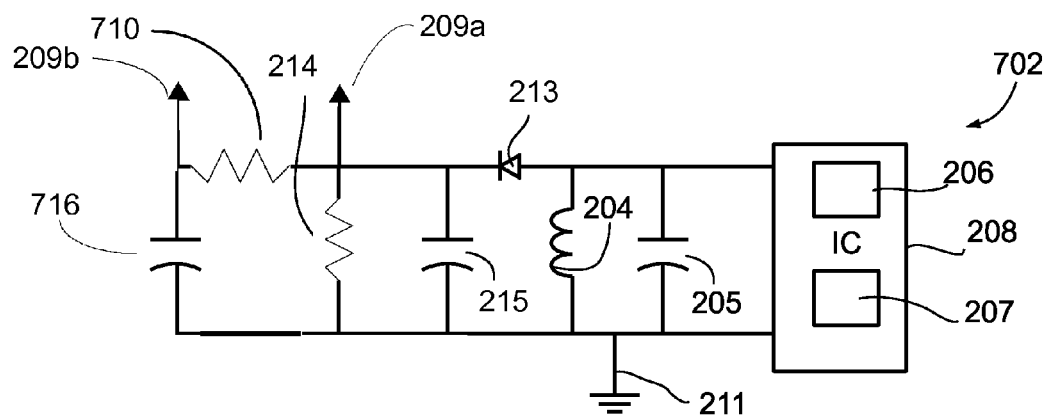
FIG. 7B shows a simplified block/circuit diagram of an exemplary electronic tag capable of generating an envelope signal and including two transmitting dipoles spaced apart in accordance with some embodiments of the present invention.

Reference is now made to FIG. 7B showing an exemplary electronic tag capable of generating an envelope signal and including two transmitting dipoles spaced apart in accordance with some embodiments of the present invention. According to some embodiments of the present invention, the electronic tag 702 is similar to electronic tag 224 (FIG. 3C), which includes an enveloping circuit. The electronic tag 702 further includes resistor 710 and capacitor 716 to produce phase shift to the signal at the output of the envelope circuit. The two envelope signals having a phase shift between them are transmitted from dipole 209a and 209b.

Figure 8:
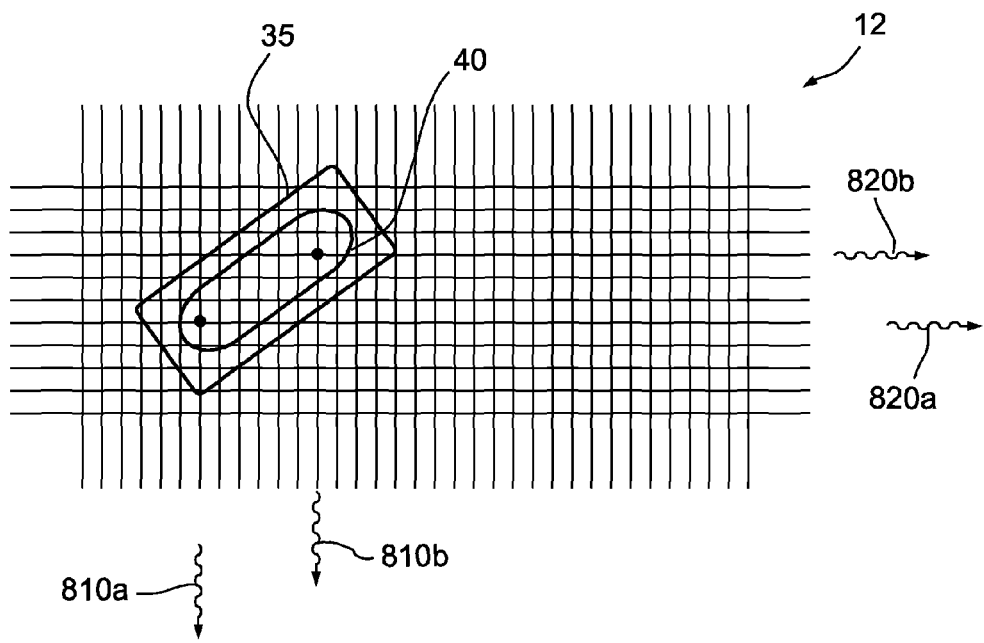
FIG. 8 shows a schematic illustration of a layout for detecting position and orientation of an object on a digitizer sensor with electronic tag including two dipoles in accordance with some embodiments of the present invention.

Reference is now made to FIG. 8 showing a schematic illustration of a method for detecting position and orientation of an object on a digitizer sensor with electronic tag including two dipoles in accordance with some embodiments of the present invention. According to some embodiments of the present invention, in response to a request by reader 45 to transmit a position signal, electronic tag 40 transmits a position signal using two dipoles 209A and 209B spaced apart. According to some embodiments of the present invention sensor 12 detects position of the signals 810A and 810B in one axis and signals 820A and 820B on orthogonal axis transmitted by each of the dipoles 209A and 209B and distinguishes between them based on the phase shift between them. Typically the transmitted signal is a pre-defined signal so that the phase shift can be readily identified. Based on the determined position of each of the dipoles, the orientation of object 40 is determined. According to some embodiments of the present invention, signals resulting from dipole 209A and 209B interfere and/or cross-talk with one another due to the relatively close spacing between them. In such cases, known methods for separating signals may be applied. For example lookup tables may be used which record sensor signals of several angle scenarios, i.e. the two dipoles at different angles and positions. In some exemplary embodiments, the distances between the dipoles are defined so that cross-talk is avoided.

Alternatively, a single object includes two electronic tags spaced apart and the orientation of the object is determined by detecting the position of each of the tags. Optionally, each tag comprises a different pre-defined position code which enables simultaneous detection of both tags.

Figure 9A:
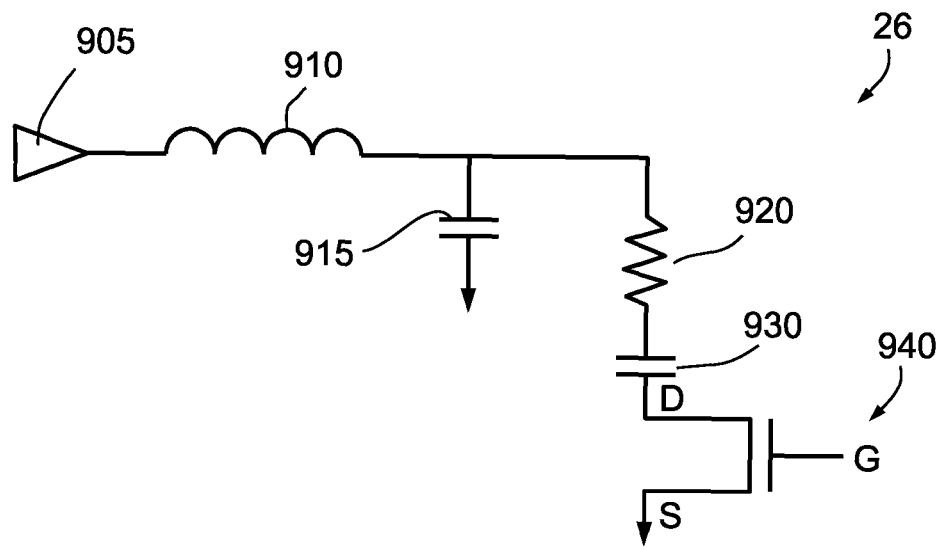
FIGS. 9A and 9B show simplified circuit diagrams of two exemplary excitation coils capable of simultaneously transmitting excitation signals in two separate frequency bands in accordance with some embodiments of the present invention.
Figure 9B:
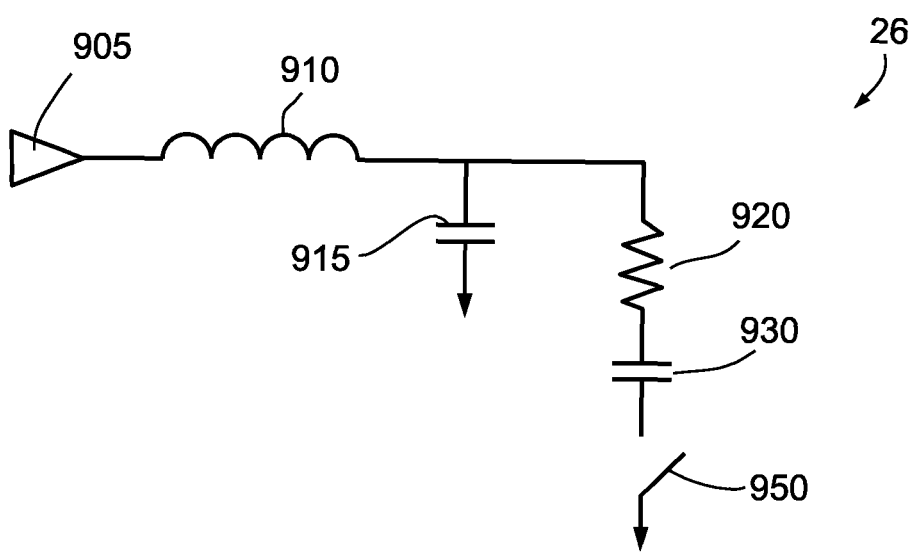

Reference is now made to FIG. 9A and 9B showing two exemplary excitation coils capable of simultaneously transmitting excitation signals in two separate frequency bands in accordance with some embodiments of the present invention. According to some embodiments of the present invention, digitizer system 100 is applied to track position of one or more stylus(es) 44, finger(s) 46, as well as a plurality of objects including electronic tags 40. According to some embodiments of the present invention, a stylus requires a triggering signal in a relatively low frequency range, e.g. 15 KHz-30 KHz or 25 KHz-28 KHz and over a relatively wide frequency band, while electronic tags 40 requires a triggering signal in a relatively higher frequency, e.g. approximately 125 KHz, typically in substantially a single frequency, i.e. narrow frequency band. According to some embodiments of the present invention, excitation coil 26 is capable of triggering both stylus 44 and electronic tag 40, e.g. simultaneously triggering both stylus 44 and electronic tag 40. According to some embodiments of the present invention, excitation coil 26 includes an amplifier 905, a first resonant circuit defined by coil 910 and capacitor 915 associated with a first Q factor, a second resonant circuit including resistor 920 and capacitor 930 associated with a second Q factor, and a Metal Oxide Semiconductor Field- Effect Transistor (MOSFET) 940. According to some embodiments of the present invention the first resonant circuit serves to provide a trigging signal to the electronic tags and typically has a high Q factor since a substantially single frequency is required. Additionally, higher Q facilitates reading sensitivity.

According to some embodiments of the present invention, the second resonant circuit is implemented to provide a triggering signal to one or more styluses 44. In some exemplary embodiments, stylus 44 includes a pressure sensitive tip and alters its transmission frequency for a change in pressure. Typically, a stylus is triggered over a frequency band as opposed to a single frequency. Triggering stylus 44 over a defined frequency band as opposed to a single frequency facilitates transmission of the stylus signal over different frequencies depending on pressure applied. According to some embodiments of the present invention, resistor 920 serves to dampen the Q factor associated with the second resonant circuit of coil 26 to provide a wider frequency band suitable for triggering the stylus.

According to some embodiments of the present invention, MOSFET 940 is included to activate and/or de-active the second resonant circuit associated with the stylus as required. In FIG. 9B an electronic switch other than a MOSFET is applied. According to some embodiments of the present invention, MOSFET 940 and/or switch 950 is controlled by digital controller 20.

According to some embodiments of the present invention, ringing cancellation is applied to coil 26 reduce oscillation of the coil after transmission of a triggering signal. Typically, the higher the Q factor of the coil, the longer the duration of the oscillations. According to some embodiments of the present invention, adding high impedance into the resonance circuit dampens the Q and terminates the oscillation almost immediately. Typically, high impedance is facilitated by amplifier 905 switching its output to high impedance.

Figure 10:
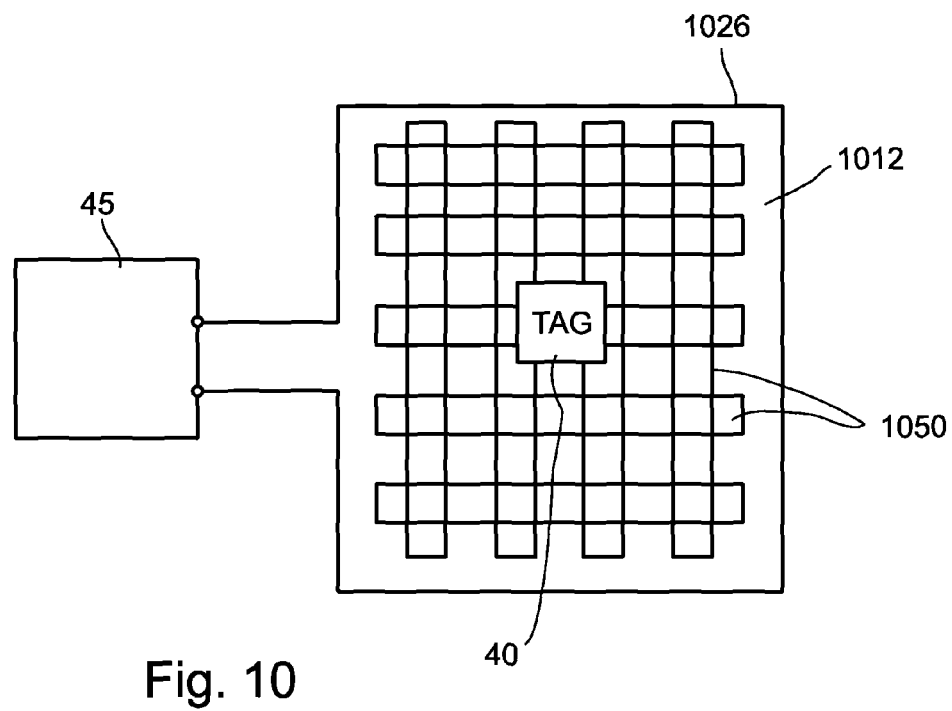
FIG. 10 shows an exemplary simplified block diagram of a digitizer system including conductive loops integrated with an electronic tag system in accordance with some embodiments of the present invention.

Reference is now made to FIG. 10 showing an exemplary simplified block diagram of a digitizer system including conductive loops integrated with an electronic tag system in accordance with some embodiments of the present invention. Although embodiments of the present invention have been described in reference to a digitizer sensor including opened ended conductive lines, other digitizer sensors can be equally applied. For example, according to some embodiments of the present invention the digitizer sensor 1012 is constructed from a plurality of conductive loop coils 1050. Although, the loops are shown as being closed, the tag that generates the magnetic field induce current in the loops which is detected by detectors now shown. Optionally, the sensor comprises a matrix of conductive loops, wherein the loops in the first set serve as transmitters and the loops in the second set serve as receivers. Optionally, a peripheral excitation coil 1026 is used for transmitting the magnetic field to be picked up by the resonance circuit of the electronic tag 40, and the coils arrangements are used for sensing the tag's signal. Optionally reader 45 produces and manages the magnetic field to be picked up by the resonance circuit of the tag. Optionally, the digitizer sensor 1012 is mounted behind a display screen, such as an LCD.

The terms "comprises," "comprising," "includes," "including," "having," and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A digitizer system comprising:
    an object incorporating an electronic circuit configured for radiating a first signal and a second signal in response to querying, the second signal separate from the first signal, wherein only the first signal is modulated with information for identifying the object;
    a digitizer sensor configured for detecting the second signal while the object is positioned on or over the digitizer sensor; and
    a reader other than the digitizer sensor operative to both query the object and detect the at least one modulated signal via air with an antenna that is separate from the digitizer sensor;
    circuitry configured for receiving input from the reader regarding the first signal detected and input from the digitizer sensor regarding location at which the second signal was detected, and for determining an identity code based on the input received by the reader, for determining a position on or over the digitizer based on the input received from the digitizer sensor, and for identifying the object and its position by associating the position detected with the identity determined.

2. The digitizer system according to claim 1, wherein the reader includes an excitation coil surrounding the digitizer sensor, wherein the excitation coil is in electrical communication with the circuitry and is configured for querying the electronic circuit.

3. The digitizer system according to claim 2 wherein the excitation coil is further configured for receiving the first signal radiated by the electronic circuit and transmitting the first signal to the circuitry configured for identifying the object.

4. The digitizer system according claim 2 wherein the excitation coil is further configured for providing a triggering signal to a stylus interacting with the digitizer sensor.

5. The digitizer system according to claim 4, wherein the triggering signal provided for the stylus is at a frequency that is lower than the frequency of a second query signal provided for the electronic circuit.

6. The digitizer system according to claim 4 wherein the triggering signal for the stylus includes a pre-defined frequency band that is significantly wider than the frequency band applied to query the electronic circuit.

7. The digitizer system according to claim 1 wherein the reader includes an antenna positioned in the vicinity of the digitizer sensor, wherein the antenna is configured for receiving the first signal radiated by the electronic circuit and transmitting the first signal to the circuitry configured for identifying the object.

8. The digitizer system according to claim 1 comprising a plurality of objects, each incorporating an electronic circuit.

9. The digitizer system according to claim 8, wherein the second signal is a signal common to at least a portion of the objects.

10. The digitizer system according to claim 1, wherein the first signal includes a binary code that comprises a stream of multiple bits.

11. The digitizer system according to claim 1, wherein the first signal is modulated based on amplitude shift keying.

12. The digitizer system according to claim 1, wherein the electronic circuit comprises a resonance circuit and an integrated circuit, wherein the integrated circuit comprises a modulator circuit configured for generating the first signal and memory unit for storing a code defining modulation of the first signal.

13. The digitizer system according to claim 12 wherein the memory unit is configured for storing information corresponding to the position of the object on or over the digitizer sensor.

14. The digitizer system according to claim 12, wherein the object comprises at least one dipole, wherein the dipole is configured for concentrating a signal for transmission around a tip.

15. The digitizer system according to claim 12, wherein the object comprises at least one dipole for converting radiation for transmission to a high near electric field and wherein the digitizer sensor is configured for detecting the electric field.

16. The digitizer system according to claim 15, comprising a switch for selectively connecting the resonance circuit to the dipole, wherein the modulator circuit is operative to connect the dipole to the resonance circuit for radiating the first signal and to disconnect the resonant circuit from the dipole for radiating the second signal.

17. The digitizer system according to claim 1, wherein the electronic circuit comprises an envelope circuit configured for generating a 4 KHz modulated signal.

18. The digitizer system according to claim 1, wherein the electronic circuit includes two dipoles spaced apart, wherein the two dipoles are configured for radiating signals with a phase shift between them.

19. The digitizer system according to claim 1, wherein the first signal represents an identification code configured for identifying the object.

20. The digitizer system according to claim 1, comprising a plurality of objects concurrently positioned on or over the digitizer sensor, each object incorporating an electronic circuit.

21. The digitizer system according to claim 1, wherein the digitizer sensor is additionally configured for detecting finger touch.

22. The digitizer system according to claim 1, comprising a display having an image that can be changed electronically, displayed thereon wherein the display underlies the digitizer sensor and wherein the digitizer sensor is substantially transparent.

23. The digitizer system according to claim 1, wherein the digitizer sensor is a grid based sensor including horizontal and vertical conducting line.

24. The digitizer system according to claim 1, wherein the digitizer includes conductive loops configured for detecting a magnetic field.

25. The digitizer system according to claim 1, wherein the object is one of a plurality of objects and wherein the electronic circuit of each of the plurality of objects is configured to radiate the first signal in response to a query generally addressing all of the plurality of objects and to radiate the second signal in response to a subsequent query specifically addressed to the one object.

26. The digitizer system according to claim 1, wherein the object is a stylus.

27. The digitizer system according to claim 1, wherein the object comprises a dipole for converting only the second signal, from the first and second signal, for transmission to a high near electric field.

28. A method for detecting an object on a digitizer sensor, the method comprising:
    placing the object on or over the surface of a digitizer sensor, wherein the object includes an electronic circuit;
    querying the object with a reader via an antenna that is separate from the digitizer sensor;
    radiating at least two different signals with the electronic circuit in response to querying, the at least two different signals including a first signal and a second signal, the second signal separate from the first signal, wherein only the first signal is modulated with information for identifying the object;
    detecting the first signal with the reader via an antenna that is separate from the digitizer sensor;
    determining an identity code from the first signal based on the modulation;
    detecting the second signal with the digitizer sensor;
    determining a position based on the detection of the second signal with the digitizer sensor; and
    identifying the object and its position by associating the position detected with the identity determined.

29. The method according to claim 28 wherein the reader includes an excitation coil surrounding the digitizer sensor and wherein the excitation coil is operative to query the object.

30. The method according claim 29 wherein the excitation coil is operative to detect the modulated signal.

31. The method according to claim 28 wherein the reader includes an antenna positioned in the vicinity of the digitizer sensor and wherein the antenna is operative to detect the modulated signal.

32. The method according to claim 28 comprising placing a plurality of objects on or over the surface of the digitizer sensor, each incorporating the electronic circuit; and detecting position based on the detection of the second signal.

33. The method according to claim 32, wherein the second signal is a signal common to at least some of the electronic tags.

34. The method according to claim 28, wherein the modulated signal includes a binary code that comprises a stream of multiple bits.

35. The method according to claim 28, wherein the electronic circuit includes memory capability.

36. The method according to claim 35 wherein the memory unit is configured for storing information corresponding to the position of the object on or over the digitizer sensor.

37. The method according to claim 28, wherein the modulated signal is modulated based on amplitude shift keying.

38. The method according to claim 28, wherein the electronic circuit is configured for generating a 4 kHz modulated signal.

39. The method according to claim 28, wherein the electronic circuit comprises at least one dipole, wherein the dipole is configured for concentrating transmission around a tip.

40. The method according to claim 28, wherein the electronic circuit comprises at least one dipole for converting radiation for transmission to a high near electric field and wherein the digitizer sensor is configured for detecting the electric field.

41. The method according to claim 40, comprising:
connecting the dipole to the resonance circuit for radiating the first signal; and
disconnecting the dipole from the resonance circuit for radiating the second signal.

42. The method according to claim 28, wherein the electronic circuit includes two dipoles spaced apart, wherein the two dipoles are configured for radiating signals with a phase shift between them.

43. The method according to claim 42 comprising determining orientation of the object based on the signals radiated from the two dipoles spaced apart.

44. The method according to claim 28, wherein the electronic circuit is a radio frequency identification tag.

45. The method according to claim 28, wherein the modulated signal represents an identification code configured for identifying the object.

46. The method according to claim 28 comprising positioning a display having an image that can be changed electronically, displayed thereon under the digitizer sensor, wherein the digitizer sensor is substantially transparent.

47. The method according to claim 28, wherein the digitizer sensor is a grid based sensor including horizontal and vertical conducting line.

48. The method according to claim 28, wherein the object is one of a plurality of objects and wherein the first signal is radiated in response to a query generally addressing all of the plurality of objects and wherein the second signal is radiated in response to a subsequent query specifically addressing the one object.

49. The method according to claim 28, wherein only the second signal, from the first and second signal, is converted for transmission to a high near electric field.

50. The method according to claim 49, wherein the first signal is transmitted in the form of a magnetic field.

51. A method for detecting an object on a digitizer sensor, the method comprising:
querying an object placed on or over the surface of a digitizer sensor, wherein the object includes an electronic circuit, the electronic circuit including memory capability with information, with a reader via an antenna that is separate from the digitizer sensor;
radiating in response to querying, a position signal via a dipole and the information via an alternate channel;
detecting the information signal with the reader via an antenna that is separate from the digitizer sensor;
detecting the position signal with the digitizer sensor; and
determining a position based on the detection of the position signal with the digitizer sensor.

* * * * *